Figure 1:
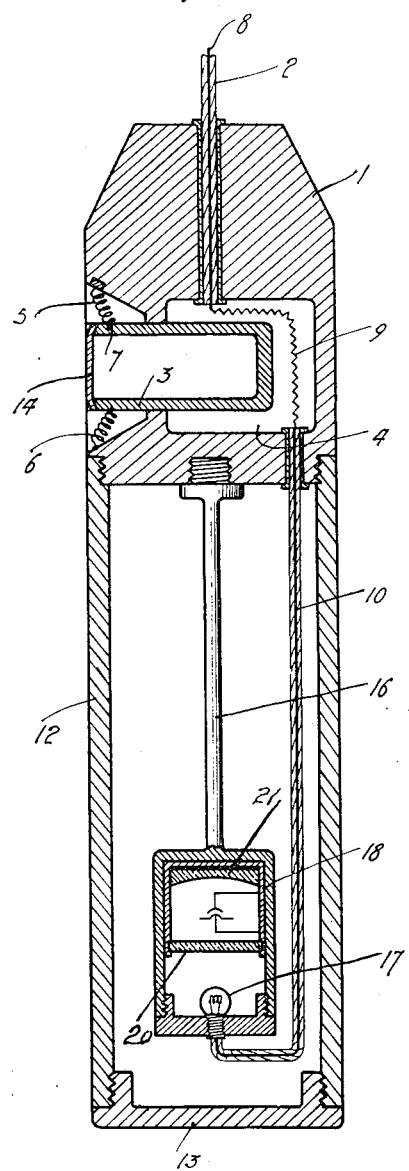

Dec. 27, 1938.    M. SCHLUMBERGER    2,141,828
ARRANGEMENT FOR DETERMINING THE ORIENTATION AND VALUE
OF DIP OF THE BEDS TRAVERSED BY A BORE HOLE
Filed April 21, 1937

Inventor:
Marcel Schlumberger
By Mauro & Lewis
Attorneys

Patented Dec. 27, 1938

2,141,8[...]

UNITED STATES PATENT OFFICE

2,141,828

ARRANGEMENT FOR DETERMINING THE ORIENTATION AND VALUE OF DIP OF THE BEDS TRAVERSED BY A BORE HOLE

Marcel Schlumberger, Paris, France, assignor to Société de Prospection Electrique, Procédés Schlumberger, Paris, France, a corporation of France Application April 21, 1937, Serial No. 138,261
In France April 25, 1936

9 Claims. (Cl. 255—1)

It is possible in certain cases, as is known, to recognize on cores, that is samples taken from the rocks traversed by a bore hole, traces of the plane of stratification of these rocks. Proposals have been made to make use of this fact to determine the orientation of dip of the beds traversed by the bore hole, that is the direction of the line of greatest slope in these beds and the direction in which they dip, as also if required the value of the dip, that is the angle between the plane of the beds and the horizontal.

Several means have already been proposed for this purpose which all utilize apparatus for taking cores comprising a hollow tool for penetrating the rocks like a milling cutter by a combined rotary and forward movement. In order subsequently to use the cores so taken to determine the characteristics of the strata dip it is necessary first to know or determine the inclination and orientation of the coring tool during the taking of the core and then to determine the position initially occupied by the core at the actual instant when the coring tool commenced to enter the rock; for, due to the rotary movement of this tool, the core itself commences to turn in this tool. The determination of the orientation of the coring tool is in general effected without difficulty by means of photographic apparatus for instance, which at the instant at which the core is taken photographs a spirit level and a compass (magnetic or gyroscopic). The determination of the initial position of the core is on the other hand more delicate. One of the methods proposed for this determination consists in tracing on the rock before taking the core a reference mark de-centered in relation to the axis of the core; but this requires a rather complicated mechanical arrangement. It has likewise been proposed for overcoming the difficulty to take several cores in different directions, a comparison of these cores then making it possible to get over the indeterminateness caused by the rotation of each core in its tool.

The present invention makes it possible to overcome these various disadvantages and to determine the characteristics of dip of the beds by means of a single core without the necessity of tracing a reference mark in advance on this core.

The apparatus constituting the invention consists essentially in the combination of apparatus for taking cores comprising a coring tool acting as a punching tool with means making it possible by photography or otherwise to register indications of the orientation and inclination of this tool at the instant at which it is projec[...] into the rock to take the core.

Apparatus for taking cores is already known which the coring tool is endowed with a sim[...] movement of translation and so acts as a pun[...] ing tool. In my United States of America Pat[...] No. 2,055,506, a description was given in part[...] ular of an arrangement for taking cores in wh[...] the coring tool is projected into the rock b[...] kind of gun to which nevertheless it remains [...] tached by a flexible connection so that thereb[...] can be extracted from the rock by simple tens[...] exerted on the gun itself. Since this tool ha[...] simple movement of translation and when it [...] entered the rock the core it has taken can[...] turn, it is sufficient to know the initial posit[...] of the tool in the gun to be able to determ[...] without difficulty when the core has been brou[...] to the surface of the ground the position [...] orientation it had in the bore hole. To know t[...] initial position of the tool in the gun this [...] rangement for taking cores will be combined w[...] an orientation arrangement of known type, cc[...] prising for instance a spirit level and a comp[...] which are photographed during the taking [...] the core.

The orientation arrangement comprising [...] instance photographic apparatus serving to p[...] tograph the compass and the spirit level is p[...] erably connected to the gun by yielding means[...] obviate injury when the shot is fired.

On the other hand the lighting up of the el[...] tric bulb serving to impress the sensitive pl[...] (where such a plate is used) is preferably cau[...] by the passage of the same current that is u[...] to heat the electric wire serving to ignite the p[...] der and thus to discharge the coring tool.

Other characteristics of the invention will [...] pear in the source of the following descripti[...]

The accompanying drawing shows by way [...] non-limiting example an embodiment of [...] present invention and therein Figure 1 is a vertical section partly diagra[...] matical of an arrangement according to the [...] vention.

Figure 2:
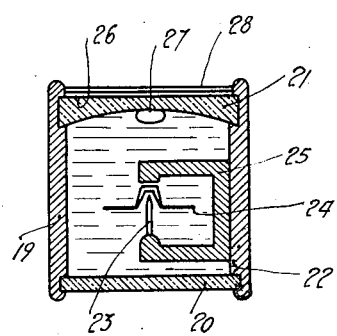
Figure 3:
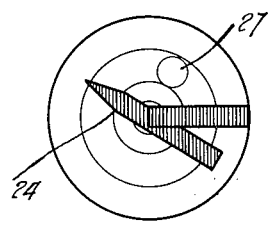

Figure 2 shows likewise in vertical section [...] a larger scale a detail of Figure 1, and Figure 3 is a diagram showing the photogra[...] ic record obtained by the apparatus of Figur[...] and 2.

Referring to Figure 1 the casing or body [...] the apparatus to be lowered into the borehol[...] suspended for instance by a cable 2 compri[...] an insulated electric conductor 8 which serve[...] actuate the apparatus.

enotes the projectile intended to take the
It may be formed, as shown, of a tube
l at its rear end and located in a corre-
ling hollow of the casing 1 constituting the
of the gun. This projectile is for example
l at its front end by a plate 14 which breaks
the impact of the projectile against the wall
e bore hole in the operation of taking a
le.
enotes the powder chamber located around
ar part of the projectile.
nd 6 denote the cables serving to connect
rojectile to the apparatus after the former
een discharged. These cables are, for the
f clarity, shown as placed above and below
ojectile. Actually they are preferably placed
lly. These cables are fixed to the pro-
: by means of lugs 7 for example, and they
mg enough for the projectile, after with-
l from the rock by tension on the
assembly by means of the cable 2 to remain
nded below the casing of the apparatus.
: insulated current supply lead 8 located in
able 2 terminates in the chamber 4 in a
9, which, being imbedded in the explosive
shown) in chamber 4, heats up when the
it passes and deflagrates said explosive.
ther end of the fuse 9 is connected to a
ictor 10, likewise insulated in the casing of
pparatus for a purpose which will be ex-
d later.
leath the apparatus just described the ori-
ion is screwed or otherwise attached. It
rises a metallic tube 12, for instance of brass
ninish any magnetic disturbance, which is
ed to the base of the casing 1. Its lower
s closed by a plate 13 likewise of brass.
: tube 12 is a metal rod 16 screwed into the
; 1 and carrying at its lower end the body
: orientation device proper, completely in-
d within tube 12. The object of this resili-
etallic rod 16 is to dampen the shock caused
e firing of the charge, which might other-
e liable to injure the orientation device.
: latter comprises as an essential feature a
17, like those used in pocket flash lamps,
ed to the base of a metal cage 18 and con-
l electrically to the conductor 10. Above
ulb in the cage 18 is the spirit level and
ass assembly, shown separately in Figure 2.
ssembly is composed of a metal cylinder 19,
ample, closed at its lower end by a flat glass
20 and at its upper part by a plano-concave
1.
ide the box thus formed is a support 22
ng on a pivot 23 a magnetized needle 24.
m 25 prevents the magnetized needle from
g its pivot. The box contains a suitable
, which fills it entirely except for a bubble
27, which constitutes the bubble of the level
ig over the concave face of the plano-con-
lens 21. On the upper face of this lens at
laced the photographic emulsion 28 (paper,
or film) which is to record the orientation.
: operation is as follows:
en the apparatus has been lowered into the
ole to the desired depth an electric current
t into the conductor 8. This current passes
gh the wire 9 and continuing by conductor
ignites the electric bulb 17, thence by the
i is passes to the frame of the apparatus and
e through the mud in which the apparatus
mersed to ground, whereby the circuit is
l. Accordingly the passage of this current
s simultaneously:

Firstly, the deflagration of the explosive and the expulsion of the projectile 3, Secondly, the ignition of the bulb 17 and consequently the impression of the photographic emulsion 28 which records by means of the projected shadow (Figure 3):

(a) the position of the magnetized needle 24, giving the orientation of the apparatus in the bore hole, (b) the position of the support 25 of this needle, which constitutes a reference mark giving for instance the direction of the gun axis, (c) the inclination and orientation of the bore hole if inclined by means of the bubble 27 of the level.

It is thus possible to deduce from it exactly the position and orientation of the gun on the firing of the projectile. The latter moves parallel to itself and if the position of the lugs 7, for example, has been determined before firing the shot it is possible to determine exactly at what inclination and orientation the projectile has penetrated the wall of the bore hole. If it is possible then to recognize on the core found inside the tubular projectile 3 the planes of stratification of the beds, the orientation and direction of this stratification can be deduced therefrom and eventually the angle they make with the vertical, that is the orientation, the direction and if applicable the value of the dip.

Of course many modifications may be made in the apparatus just described without going beyond the scope of the present invention.

In particular the coring apparatus could comprise several guns one above another.

Further the coring apparatus could be arranged to fire projectiles not only horizontally but equally well in any oblique direction or even vertically.

Moreover the flexible suspension of the orientation apparatus could be constituted in any other manner. Instead of the flexible rod a rubber suspension could for instance be provided.

What I claim is:

1. Apparatus for determining the orientation and value of the dip of the beds traversed by a bore hole comprising a coring tool carrier, means for lowering the carrier into the bore hole, a coring tool connected to the carrier, means for causing the coring tool to penetrate the rock surrounding the bore hole, and means integral with the support for determining he orientation of the coring tool at the instant at which it is actuated to penetrate the rock.

2. Apparatus for determining the orientation and value of the dip of the beds traversed by a bore hole comprising a coring tool carrier, means for lowering the carrier into the bore hole, an explosion chamber for an explosive in this tool carrier, a coring tool connected to the tool carrier and placed in the explosion chamber, means for deflagrating the explosive contained in the explosion chamber, and means yieldingly connected to the tool carrier for determining the orientation of the coring tool at the instant of explosion.

3. Apparatus for determining the orientation and value of the dip of the beds traversed by a bore hole comprising a coring tool carrier, an explosion chamber for an explosive in the tool carrier, means for lowering the carrier into the bore hole, a coring tool in the explosion chamber, electrical means for deflagrating the explosive in the explosion chamber, a yielding connection between the coring tool and the tool carrier, a support yieldingly connected to the tool carrier, members in the support to mark a fixed direction, and means for recording at the instant of the explosion the position of the coring tool in relation to the fixed direction.

4. Apparatus for determining the orientation and value of the dip of the beds traversed by a bore hole comprising a coring tool carrier, an explosion chamber for an explosive in the tool carrier, means for lowering the carrier into the bore hole, a coring tool in the explosion chamber, a yielding connection between the tool carrier and the coring tool, a hollow member yieldingly connected to the tool carrier, two compartments in this hollow member, a flat transparent plate separating the two compartments, a phoographic emulsion on the bottom of one of the compartments, a plano-concave transparent lens covering the said photographic emulsion by its flat face, a liquid filling the compartment with the exception of a bubble constituting a level bubble, a reference arm mark fixed to the wall of the compartment, a magnetized needle at the free end of the reference arm mark, an electric bulb in the second compartment, a cable for lowering the tool carrier in the bore hole, a conducting wire in this cable, a fuse in series with this wire where it passes through the explosion chamber, a bulb at the end of this wire in the second compartment of the hollow member, a source of current and switches for causing a current to pass through the wire.

5. A device for determining the orientation and value of the dip of the beds traversed by a bore hole comprising means for ejecting a coring tool and forcing it into the wall of a bore hole by means of an explosive charge, and means for determining the orientation of the coring tool at the moment when the explosion takes place.

6. A device for determining the orientation and value of the dip of the beds traversed by a bore hole comprising a coring tool, means for ejecting said coring tool and forcing it into the wall of the bore hole through the explosion of an explosive charge, electrical means for deflagrating the explosive charge, means for indicating the position of the coring tool, and photographic means controlled through the electrical means for deflagrating the explosive charge, said photographic means serving to register the position of the coring tool at the time when the explosion takes place.

7. A device for determining the value and the orientation of the dip of the beds traversed by a bore hole comprising a coring tool, means for ejecting said coring tool and forcing it into the wall of the bore hole through the explosion of an explosive charge, electrical means for deflagrating the explosive charge, means for indicating the position of the coring tool, and photographic means simultaneously actuated at the deflagration of the explosive charge and through the electrical means for deflagrating said explosive charge, said photographic means serving to register the position of the coring tool at the time when the explosion takes place.

8. Apparatus for determining the orientation and value of the dip of the beds traversed by a bore hole comprising a coring tool carrier, an explosion chamber for an explosive in the tool carrier, means for lowering the carrier into the bore hole, a coring tool in the explosion chamber, electrical means for deflagrating the explosive in the explosion chamber, a member connected to the tool carrier, a reference arm mark attached to this member, a photographical emulsion on this member, and means for lighting the photographical emulsion at the time when the explosion is produced in the explosion chamber.

9. Apparatus for determining the orientation and value of the dip of the beds traversed by a bore hole comprising a coring tool carrier, an explosion chamber for an explosive in the tool carrier, means for lowering the carrier into the bore hole, a coring tool in the explosion chamber, electrical means for deflagrating the explosive in the explosion chamber, a member yieldingly connected to the tool carrier, a reference arm mark fixed to this member, a photographical emulsion on this member, and means for lighting the photographical emulsion at the time when the explosion is produced in the explosion chamber.

MARCEL SCHLUMBERGER.